United States Patent [19]
Dumoulin et al.

[11] Patent Number: 5,958,503
[45] Date of Patent: Sep. 28, 1999

[54] PROCESS OF MAKING A FRUIT GANACHE

[75] Inventors: Dimitri Dumoulin, Ghoy; Jean-Luc Rene Soyeur, Rebecq, both of Belgium

[73] Assignee: Puratos Naamloze Vennootshcap, Groot-Bijgarden, Belgium

[21] Appl. No.: 08/804,298

[22] Filed: Feb. 21, 1997

[30] Foreign Application Priority Data

Feb. 22, 1996 [EP] European Pat. Off. .............. 96870014

[51] Int. Cl.⁶ ....................................... A23L 1/09
[52] U.S. Cl. ........................ 426/659; 426/601; 426/602; 426/603; 426/604; 426/613; 426/615; 426/654; 426/659; 426/660
[58] Field of Search ..................................... 426/601, 602, 426/603, 604, 613, 615, 654, 660, 659

[56] References Cited

U.S. PATENT DOCUMENTS 2,532,523  12/1950  Trempel et al. ........................ 426/659
5,104,680  4/1992  Padley et al. ............................ 426/659

OTHER PUBLICATIONS

Clyne, E. "A Course in Confectionery", vol. 1 & 2, Sidney Press Ltd., London, pp. 282. 283, Nov. 1955.
Editors of Time Life Books, "Candy", Time Inc., pp. 38 & 39, 1981.

*Primary Examiner*—Helen Pratt
*Attorney, Agent, or Firm*—Knobbe, Martens, Olson & Bear, LLP

[57] ABSTRACT

A fruit ganache for decorating, coating and/or filling pastry, biscuit and/or chocolate product, which has the physical and functional properties of a ganache, contains fruit, fruit extracts, or fruit substitutes and a fat which is a cocoa butter substitute in the form of a solid fat when kept at 25° C., as well as the usual ingredients of a ganache, namely sugar or a sugar substitute, water, one or more emulsifiers, milk or a reconstituted product based on milk powder and optionally additives. The fruit ganache is in the form of a water-in-oil emulsion.

14 Claims, No Drawings

5,958,503

PROCESS OF MAKING A FRUIT GANACHE

SUBJECT OF THE INVENTION

The present invention relates to a new food product for decorating, coating and/or filling, termed fruit ganache, process for producing it and the pastry, biscuit and chocolate products comprising the said food product.

TECHNOLOGICAL BACKGROUND FORMING THE BASIS OF THE INVENTION

A "conventional" chocolate ganache is, at room temperature (20° C.), a pasty product in the form of an oil-in-water emulsion in which the sugars and the fats are crystallized.

The sugars are those supplied by the chocolate, the milk and the sugar added to supersaturation. The fat is the fat supplied by the chocolate and that optionally added to obtain a ganache.

The dark chocolate termed "fondant" in Belgium, generally used to prepare a ganache, is composed of the following materials: cocoa mass, cocoa butter, sugar, emulsifier (lecithin).

In addition to chocolate, sugar, water, emulsifiers, milk and optionally glucose syrup are also present in the composition of a ganache.

At a temperature of the order of 35 to 40° C., this fat liquefies and part of the sugar is solubilized. The viscosity of the product at this temperature remains high and makes it possible to use the latter to coat and mask food products, in particular pastries. During the cooling, the recrystallization process resumes and the product hardens. In addition, its surface becomes slightly brilliant.

Furthermore, ganache is a product which has overrun properties which also allow its use as filling, for example in the filling of filled chocolates, termed "pralines" in Belgium.

A description of such a product exists in detail in the document Confectionary Production (Nyffler E., Vol. 37(12), pp. 713–733 (1971)).

In order to diversify and improve bakery and pastry products, the desire exists within the bakery-pastry trade to be able to incorporate into a ganache, of the chocolate ganache type (with white chocolate or with dark chocolate), fruit in different forms (ground fresh fruit, fruit puree, fruit juice and the like). This product would have the physical properties of a chocolate ganache and a fruity taste.

The combination of a chocolate ganache with fruit leads to an incompatibility, namely that of the (neutral) chocolate taste with an acid fruit-like taste.

The invention aims to solve this problem and in particular to balance the functional properties of each of the components of a fruit ganache so as to ensure their compatibility.

STATE OF THE ART

The document EP 0 440 203 A1 in the name of Lotte Co. Ltd. describes mixtures of oil, sugar, fruit, milk and emulsifiers. The said product does not correspond to the definition of a ganache with fruit.

The document WO 85/02757-A describes products which are a combination of chocolate and fruit.

The document EP 0 294 119 A presents an artificial cream which is an oil-in-water type dispersion containing a large quantity of water (40–70%).

The document EP 0 427 544 A describes a method for the manufacture of a chocolate which contains a certain quantity of water.

The document U.S. Pat. No. 5,460,847 describes a "traditional" chocolate ganache and a method for its manufacture. It is an oil-in-water type emulsion.

The document U.S. Pat. No. 5,364,653 describes a confectionary product with a fruity taste. This product is molded for consumption in the state of a solid product (candybar).

AIMS OF THE INVENTION

The present invention aims to obtain a new food product for decorating, coating and/or filling, which may be defined as a fruit ganache, whose components are adapted so as to be mutually compatible, while exhibiting similar and/or improved characteristics compared with those of a "conventional" chocolate ganache, namely a composition:

which is pasty to semi-solid in its wrapping, but can be worked with a spatula, which remelts at a temperature of 35 to 40° C., which has a viscosity allowing the coating of pastries, which sets rapidly and allows rapid handling of the said pastries, which allows clean cutting of the said pastries, which gives brilliance to the finished product, which has overrun properties allowing a use as filling, for example in "praline" filling (filled chocolates), which is stable to freezing and thawing, and/or which is not very sensitive to oxidation.

In addition, the present invention also aims to obtain a process for the production of the said fruit ganache.

In particular, the present invention aims to obtain a process of production whose implementation is simple and rapid.

CHARACTERISTIC FEATURES OF THE PRESENT INVENTION

The Inventors have sought to obtain a new food product which may be termed a "fruit ganache" in which certain components are adapted so as to make them mutually compatible.

"Fruit ganache" is understood to mean a food composition for the decorating, coating and/or filling of food compositions in the pastry, biscuit and/or chocolate sector, with fruit, whose physical, functional and organoleptic characteristics (texture, structure and the like) correspond to the characteristics of a "conventional" chocolate ganache.

Consequently, in the said "fruit ganache", it was sought to substitute some of the characteristic ingredients of chocolate (present in a "conventional" chocolate ganache) while preserving the functional and organoleptic properties conferred by the chocolate in a ganache.

The present invention relates to a new food product for decorating, coating and/or filling termed "fruit ganache", which has the physical and functional properties of a ganache and which comprises fruit, fruit extracts (fruit juices or purees) or fruit substitutes and a fat which is a cocoa butter substitute (in the form of a solid fat at 25° C.), as well as the usual ingredients of a ganache (namely sugar (or a sugar substitute), water, one or more emulsifiers, milk or a reconstituted product based on milk powder and optionally additives such as sucrose syrups, colorings and/or flavorings), in the form of a water-in-oil emulsion.

The water content of this food product is preferably less than 20% by weight, preferably between 10% and 20% by weight.

In the said food product, the cocoa butter substitute (CBS) is used for the total or partial replacement of cocoa butter.

Advantageously, the said cocoa butter substitute is palm kernel oil, preferably fractionated, hydrogenated, bleached, refined and deodorized (HPKO).

This cocoa butter substitute makes it possible obtain a food product (fruit ganache) having the owing advantageous properties:

the crystallization time is short, it does not require any tempering operation, the product exhibits a prolonged brilliance retention over time, the product has a low polyunsaturated fatty acid level which allows a better resistance of the product to oxidation, the product has a melting point in the vicinity of 30 to 35° C.

According to another preferred embodiment of invention, the said cocoa butter substitute is nut oil.

Preferably, the said fat is also characterized a "Solid Fat Content (SFC)" determined by nuclear magnetic resonance (NMR) according to the IUPAC method 2,150a and as defined in table I below:

TABLE I

| Temperature (° C.) | SFC | Variation |
|---|---|---|
| 20 | 90 | " 10 |
| 25 | 86 | " 8 |
| 30 | 43 | " 5 |
| 35 | 3 | " 5 |
| 40 | 0 | " 1 |

Preferably, the fat used in the said ganache advantageously has an iodine value lower than 20 as determined by the AOAC method (Official Method of Analysis, 15th edition, vol. 2, p. 956 (1990)).

Advantageously, the said food product according to the invention also comprises an acidity regulator (regulator of the pH of the composition obtained) preferably consisting of citric acid. In addition, the latter offers an organoleptic sensation of "freshness" necessary in a fruit composition.

Furthermore, in order to make the said food product milder (for specific cultural and dietary reasons), it may also comprise tartaric acid.

The said food product also comprises fruits, provided, for example, in the form of purées or concentrated juices having dry matter contents preferably varying according to the type of fruit between 30 and 65%. For example, in the case of a lemon ganache, the percentage is 45%.

Among the usual ingredients for the said food product, the sugar is preferably a granulated sugar with a fine to medium particle size distribution, similar to that used for the preparation of a "conventional" chocolate ganache.

In the said food product, the milk is preferably a sweetened condensed skimmed milk having a dry matter content of 72%. However, another milk source having a different dry matter content may be used (condensed non-skimmed milk, milk powder-based reconstituted product, and the like), provided there is a reequilibration of the different ingredients of the composition of the fruit ganache.

The composition of the said food product also comprises emulsifiers. The milk, by virtue of its protein components, has good emulsifying properties; but given the fat supply of the fruit ganache according to the invention, an emulsifier was added to stabilize the emulsion and control its viscosity. The most suitable emulsifiers are lecithin, Tween, mono- and diglycerides and lactic esters of fatty acids.

Preferably, in the composition of the said food product according to the invention, the optimum fat/milk ratio is in the vicinity of 2. The aim is to obtain a food product (fruit ganache) which has properties comparable to those of a "conventional" chocolate ganache. Indeed, the chocolate provides a lot of viscosity during use, which allows the pâtissier to coat the pastries with a chocolate layer of 1 to 3 mm.

By adapting the different parameters of the components of the food product according to the invention, it is possible to obtain a stable product which has qualities comparable to those of a "conventional" chocolate ganache.

If the fat/milk ratio exceeds 2, there is a risk of instability of the product, a loss of opacity, a loss of viscosity or an excessive solidification of the product in its wrapping. However, by increasing the milk content in the composition, it is possible to induce a slower crystallization and obtain a product which no longer dries at the surface.

It should be noted that the stability characteristics of the said product also induce its overrun properties, which allow its use as a filling, in particular in the filling of "pralines".

In addition, it should be noted that the food product according to the invention exhibits little or no phenomenon of inversion of sucrose, which, in acidic medium, would be capable of inducing biochemical phenomena of anticrystallization which would hamper the use and the advantageous properties of the said food product according to the invention.

The present invention also relates to the process for the production of the said food product, comprising the following stages:

sugar is dissolved in water;

the solution obtained is then tempered at a temperature of between 55 and 60° C.;

a fat which is a cocoa butter substitute as defined above is melted with one or more emulsifiers and tempered at a temperature of the order of 60° C.;

the fat is then transferred into the sugar solution, with slow stirring, so as to form an emulsion;

the tempered milk is then added to the emulsion at a temperature of between 25 and 20° C.;

the composition is then kept, with slow stirring, until a homogeneous paste is obtained;

the fruit, provided for example in the form of a purée or concentrated fruit juice, as well as an acidity regulator and optionally natural flavoring and/or coloring are added to the paste obtained in order to form the composition of the food product according to the invention.

Advantageously, the said product also comprises a stage for evaporation of the aqueous solvent from the sugar solution, so as to reduce the dry matter content of the emulsion.

A final aspect of the present invention relates to food compositions, especially pastry, biscuit and/or chocolate products, for example filled chocolates (pralines), comprising the food product according to the invention.

DESCRIPTION OF A PREFERRED EMBODIMENT OF THE INVENTION

1. Ingredients

|  | Proportion |
|---|---|
| Sugar: | 30–40% |
| Fat: | 20–30% |
| Milk: | 10–20% |
| Fruit (concentrated lemon juice): | 10–20% |
| Water: | 5–15% |
| Emulsifier: | 0.5–1.0% |
| Acidity regulator: | 0.5–1.0% |
| Natural flavoring/coloring: | 0.1–0.5% |

2. Process of Production

The sugar is dissolved in water with an optional intermediate evaporation stage in order to obtain the desired dry matter content; the solution is tempered at 55–60° C. (system A).

The fat (cocoa butter substitute) is melted with the emulsifiers and tempered at 60° C. (system B).

The fat of system B is transferred into the sugar solution of system A, with slow stirring.

When the emulsion is formed, the milk tempered at 25–30° C. is added.

The system is kept, with slow stirring, until a homogeneous paste is obtained.

At the end of the process, the lemon juice, the acidity regulator and the flavoring or coloring components are added.

In the said process, some parameters are optimized compared with the process for the production of a "conventional" chocolate ganache.

Indeed, the viscosity of the ganache at 30–35° C. during the remelting of the composition according to the invention by the user is crucial. This functional property which exists in a "conventional" chocolate ganache is obtained by the presence of the chocolate which provides a lot of viscosity during use, thereby allowing, for example, the pâtissier to coat the pastries with a chocolate layer of 2 to 3 mm.

In the food product (fruit ganache) according to the invention, it is possible to obtain the same viscosity at high temperature, by decreasing the added free water content, if necessary with an intermediate stage for evaporation of the sugar solution.

It is also possible to obtain this result by increasing the fatty phase. However, an excess of fat may induce an instability of the emulsion, a loss of opacity, a loss of viscosity or an excessive solidification of the product in its wrapping.

It is also possible to increase the milk content, knowing that an excess may however induce a slower crystallization and a product which no longer dries at the surface.

Furthermore, it is also possible to modify the ratio of the different emulsifiers.

To obtain the rapid setting of the product after application, it is important to optimize the total fat and sugar content, in particular the milk content.

In order to avoid the sucrose inversion properties (anticrystallization phenomenon which occurs in acidic medium), the fruit and the acidity regulator (citric acid) are added to the composition at the end of the production process.

In addition, the brilliance of the fruit ganache coating pastries is ensured by a rigorous control of the temperatures in the process for the preparation of the fruit ganache according to the invention.

This type of fruit ganache may serve for the preparation of pastries of the following types: Eclair, Javanais, coating, Bavarois, Sacher Torte, lemon biscuit, and the like.

We claim:

1. A process for the production of a fruit ganache, comprising the steps of:

dissolving sugar or a sugar substitute in water to form a sugar solution;

heating and maintaining the temperature of the sugar solution at a temperature of between 55 and 60° C.;

melting a fat which is a cocoa butter substitute, wherein the cocoa butter substitute is in the form of a solid fat when kept at 25° C. with one or more emulsifiers and tempering the melted fat at a temperature of approximately 60° C.;

transferring the tempered fat into the sugar solution, during slow stirring, to form a water-in-oil emulsion;

adding a milk or reconstituted product based on milk powder, which has been tempered, to the emulsion at a temperature of between 20 and 25° C.;

slowly stirring the milk-added emulsion until a homogeneous paste is obtained; and adding fruit, fruit extracts, or fruit substitute to the paste, thereby producing the fruit ganache.

2. The process according to claim 1, further comprising evaporating the water from the sugar solution prior to the addition of the tempered fat thereto.

3. The process according to claim 1, additionally comprising adding natural flavorings and/or colorings to the paste.

4. The process according to claim 1, wherein the water content of the fruit ganache is less than 20% by weight.

5. The process according to claim 4, wherein water content of the fruit ganache is between 10% and 20%.

6. The process according to claim 1, wherein the cocoa butter substitute is palm kernel oil or coconut oil.

7. The process according to claim 6, wherein the cocoa butter substitute is fractionated, hydrogenated, bleached, refined and deodorized palm kernel oil.

8. The process according to claim 1, wherein the cocoa butter substitute has a solid fat content of approximately 90% at 20° C., 86% at 25° C., 43% at 30° C., 3% at 35° C., and 0% at 40° C.

9. The process according to claim 1, wherein the cocoa butter substitute has an iodine value of less than 20.

10. The process according to claim 1, further comprising adding an acidity regulator.

11. The process according to claim 10, wherein said acidity regulator is citric acid.

12. The process according to claim 1, further comprising adding tartaric acid.

13. The process according to claim 1, wherein the fat/milk ratio is approximately 2.

14. The process according to claim 1, wherein said fruit extracts are fruit juices or pureés.

\* \* \* \* \*